US012812009B2

(12) United States Patent
Wintsch et al.

(10) Patent No.: US 12,812,009 B2
(45) Date of Patent: Nov. 24, 2026

(54) FIELD DEVICE AND METHOD FOR CONTROLLING A NEAR FIELD COMMUNICATION VIA A NEAR FIELD COMMUNICATION SYSTEM OF A FIELD DEVICE

(71) Applicant: BELIMO HOLDING AG, Hinwil (CH)

(72) Inventors: Pasquale Wintsch, Hinwil (CH); Thomas Popp, Rapperswil-Jona (CH)

(73) Assignee: BELIMO HOLDING AG, Hinwil (CH)

( * ) Notice: Subject to any disclaimer, the term of this patent is extended or adjusted under 35 U.S.C. 154(b) by 94 days.

(21) Appl. No.: 18/858,948

(22) PCT Filed: May 11, 2023

(86) PCT No.: PCT/EP2023/062542
§ 371 (c)(1),
(2) Date: Oct. 22, 2024

(87) PCT Pub. No.: WO2023/217932
PCT Pub. Date: Nov. 16, 2023

(65) Prior Publication Data

US 2025/0294074 A1 Sep. 18, 2025

(30) Foreign Application Priority Data

May 13, 2022 (CH) .......................... CH000581/2022

(51) Int. Cl.
*H04L 67/12* (2022.01)
*H04L 67/025* (2022.01)
*H04L 67/52* (2022.01)

(52) U.S. Cl.
CPC ............ *H04L 67/12* (2013.01); *H04L 67/025* (2013.01); *H04L 67/52* (2022.05)

(58) Field of Classification Search
CPC ........ H04L 67/12; H04L 67/52; H04L 67/025
See application file for complete search history.

(56) References Cited

U.S. PATENT DOCUMENTS 11,835,932 B2 * 12/2023 Magnavacca ........... H04W 4/80
11,867,420 B2 * 1/2024 Sinha .................... H04W 76/10
(Continued)

OTHER PUBLICATIONS

Swiss Search Report for CH 5812022, dated Aug. 26, 2022.
International Search Report for PCT/EP2023/062542, dated Jun. 16, 2023.

*Primary Examiner* — Minh Chau Nguyen
(74) *Attorney, Agent, or Firm* — Sughrue Mion, PLLC

(57) ABSTRACT

A field device of a heating, ventilation and air conditioning system including a microcontroller that controls the field device, and a near field communication system which is connected to the microcontroller and which includes a near field communication chip and an antenna, the near field communication system for a near field communication with a near field communication device. The near field communication system controls the near field communication in response to receiving a control signal from the microcontroller or the near field communication device, and the near field communication system disables the near field communication in response to discerning in the control signal a disablement signal, or enables the near field communication in response to discerning in the control signal an enablement signal.

17 Claims, 6 Drawing Sheets

(56) References Cited

U.S. PATENT DOCUMENTS

| | | | | |
|---|---|---|---|---|
| 2013/0198813 | A1* | 8/2013 | Van Roermund | G06F 21/30 726/4 |
| 2016/0138821 | A1 | 5/2016 | Shaull et al. | |
| 2016/0255459 | A1* | 9/2016 | Sarkar | H04W 12/04 455/41.1 |
| 2018/0376313 | A1* | 12/2018 | Horton | H04L 12/2816 |

* cited by examiner

FIELD DEVICE AND METHOD FOR CONTROLLING A NEAR FIELD COMMUNICATION VIA A NEAR FIELD COMMUNICATION SYSTEM OF A FIELD DEVICE

CROSS REFERENCE TO RELATED APPLICATIONS

This application is a National Stage of International Application No. PCT/EP2023/062542 filed May 11, 2023, claiming priority based on Swiss Patent Application No. CH000581/2022 filed May 13, 2022, the contents of each of which being herein incorporated by reference in their entireties.

FIELD OF THE DISCLOSURE

The present disclosure relates to a field device and to a method for controlling a near field communication via a near field communication system of a field device. Specifically, the present disclosure relates to a field device, a heating, ventilation and air conditioning (HVAC) system comprising a field device, a method for controlling a near field communication via a near field communication system of a field device and to a computer program product for controlling a near field communication via a near field communication system of a field device.

BACKGROUND OF THE DISCLOSURE

A heating, ventilation and air conditioning system, in short HVAC system, is a system using various technologies to control the temperature, humidity, purity and/or further parameters in an enclosed space or at least a partially enclosed space. Conventional HVAC systems comprise for example, heating systems, cooling systems and/or ventilation systems in order to control the above-mentioned parameters of the enclosed space. The enclosed space is, for example, a building or a particular area within the building.

In order to control and to adjust the above-mentioned parameters of the enclosed space, the HVAC system conventionally comprises at least one field device. The field device is, for example a sensor unit, an actuator unit, a valve unit, a damper unit or a combination of the aforementioned. The field device measures for example a temperature value, which is transferred to a central unit of the HVAC system for processing. The central unit may control, using the received temperature value, a particular valve unit (field device) of the HVAC System to increase or reduce a fluid flow, which increases or reduced the temperature in the enclosed space.

A particular important aspect of a HVAC system is to properly configure and adjust the system at commissioning/starting of the HVAC system. Different parts of the HVAC system, like central units and/or field devices may have to be adjusted and configured. The initial configuration may be performed via a near field communication (NFC) interface between the central units/the field devices and a commissioning device. The commissioning device is for example a specific device, which is used by an operator to configure the specific field devices and/or additional parts of the HVAC system. Commissioning the HVAC system via available NFC interfaces is comparably simple because no wired connection between the specific device and the field device, which is to be commissioned, is required.

This relatively simple access possibility to the HVAC system provides also a relatively simple access point for third parties to the HVAC system. To avoid such an unintended access or a break into the HVAC system, the HVAC system may comprise barriers to avoid the unintended access by third parties. A conventional obstacle to accessing the HVAC system is to place the different parts/units of the HVAC system at restricted areas of the building, which require specific access permissions. Nevertheless, the HVAC system itself is in this scenario not protected by the unintended access by third parties. In particular, during a construction phase or a renovation phase of a building the restricted areas may not be closed for third parties at all times, which may give third parties access to the HVAC system. Further, the HVAC system or different parts of the HVAC system may be attacked during shipment or installation.

SUMMARY OF THE DISCLOSURE

It is an object of the present disclosure to provide a field device and a method for controlling a near field communication of a field device. In particular, it is an object of the present disclosure to provide a field device and a method for controlling a near field communication of a field device, which do not have at least some of the disadvantages of the prior art.

According to the present disclosure, these objects are addressed by the features of the independent claims. In addition, further advantageous embodiments follow from the dependent claims and the description.

According to the present disclosure, a field device of a heating, ventilation and air conditioning system is specified. The field device comprises: a microcontroller configured to control the field device; a near field communication system which is connected to the microcontroller and which comprises a near field communication chip and an antenna, the near field communication system being configured for a near field communication with a near field communication device, wherein the near field communication system is configured to control the near field communication in response to receiving a control signal from the microcontroller or the near field communication device.

In an embodiment, the near field communication system is configured to disable the near field communication in response to discerning in the control signal a disablement signal, or the near field communication system is configured to enable the near field communication in response to discerning in the control signal an enablement signal. The control signal comprises the disablement signal or the enablement signal discernable by the near field communication system.

In an embodiment, the field device further comprises a power supply terminal configured to supply electrical energy to the field device, and the microcontroller is configured to detect a missing electrical energy supply on the power supply terminal, and to send the control signal comprising the disablement signal to the near field communication system, upon detection of the missing electrical energy supply. In a further embodiment, the microcontroller is configured to detect an existing electrical energy supply on the power supply terminal, and to send the control signal comprising the enablement signal to the near field communication system, upon detection of the existing electrical energy supply.

In an embodiment, the field device comprises a power monitoring system, which is configured to monitor the power supply terminal, and wherein the power monitoring system is configured to transmit current power supply information to the microcontroller and/or to the near field communication device. The power supply information may be used to determine the missing/existing electrical energy supply of the field device via the power supply terminal.

In an embodiment, the field device further comprises a bus interface and/or an Ethernet interface configured to transfer data from and to the field device, and the microcontroller is configured to detect a missing interface connection, and to send the control signal comprising the disablement signal to the near field communication system, upon detection of the missing interface connection.

In another embodiment, the microcontroller is configured to detect an existing interface connection, and to send the control signal comprising the disablement signal to the near field communication system, upon detection of the existing interface connection. In this embodiment, an unintended access to the remote server from the near field communication device via the field device may be prevented.

In an embodiment, the microcontroller comprises an energy buffer configured to supply electrical energy to the microcontroller, wherein the microcontroller is configured to send the control signal to the near field communication system using energy from the energy buffer. The energy buffer is for example, a small battery, which provides electrical energy for the microcontroller in case the power supply does not. In an embodiment, the energy buffer is a parasitic capacitance, which provides still enough electrical energy to the microcontroller for sending the disablement signal.

In an embodiment, the energy buffer is provided via the near field communication device. In an embodiment, the energy buffer is also used to supply electrical energy to the power monitoring system.

In an embodiment, the field device is configured to transmit power supply information to the near field communication device, and the near field communication system is configured to receive from the near field communication device the control signal comprising the disablement signal, responsive to the power supply information indicating the missing electrical energy supply.

In an embodiment, the power supply information comprises information on the electrical energy supply of the microcontroller and/or of the near field communication chip of the near field communication system. In a further embodiment, the power supply information is a missing response to a request from the near field communication device.

In an embodiment, the near field communication system is configured to permanently disable the near field communication in response to discerning in the control signal a permanent disablement signal. In this embodiment, the control signal comprises a permanent disablement signal discernable by the near field communication system. The permanently disabling of the near field communication is not reversible. In other words, the permanent disablement signal is a so-called "chip kill" control signal or control command.

In an embodiment, the microcontroller is configured to detect a configuration of the field device by the near field communication device via the near field communication system, and the near field communication system is configured to permanently disable the near field communication only after detection of the configuration of the field device. The permanent disablement signal is, for example, sent before or after accessing and configuring of the field device. Configuring the field device may comprise commissioning of the field device, adjusting settings of the field device or making initial settings of the field device.

In an embodiment, the near field communication system further comprises a switching element configured to control the near field communication of the field device using the control signal, wherein controlling by the switching element comprises interrupting or closing an internal connection of the near field communication chip or a connection between the near field communication chip and the microcontroller and/or the antenna. The switching element is therefore configured to enable and/or disable the near field communication of the near field communication system.

In an embodiment, the switching element for controlling the near field communication comprises or is a fuse, preferably an electronic fuse. The fuse is in particular configured for permanently disabling the near field communication. The electronic fuse for example controlled by the microcontroller or the near field communication chip, e.g. such that a connection is interrupted for disabling the near field communication.

In an embodiment, the microcontroller is configured to determine a current geographical position of the field device, to compare the current geographical position of the field device with a predefined geographical region, and to send the control signal comprising the disablement signal to the near field communication system, upon detection that the current geographical position of the field device is outside the predefined geographical region. In a further embodiment, the microcontroller is configured to send the control signal comprising the enablement signal to the near field communication system, upon detection that the current geographical position of the field device is inside the predefined geographical region. The current geographical positon is determined, for example, using a position-detecting unit of the field device or of the near field communication device.

In an embodiment, the near field communication system disables the near field communication as a default setting. In a further embodiment, the near field communication system receives the control signal comprising the enablement signal in dependence of specific properties of the field device, like the power supply status, the current geographical position, and a connection status and/or time specific properties.

The predefined geographical region may be stored in the field device and/or in the near field communication device. The predefined geographical region may also be stored in a remote server and may be retrieved by the near field communication device or by the field device in dependence of the specific field device. In an embodiment, the predefined geographical region is a predefined usage place of the field device. In other words, the predefined usage place may be the area of the building for which the field device is intended. The predefined geographical region is, in another embodiment, a continent, a country or an area within a country, a building within an area or a building portion of a building.

In an embodiment, the control signal comprising the enablement signal is only received by the near field communication system during one or more predefined timespan (s).

In an embodiment, the near field communication system is configured to control the near field communication in response to receiving via a building automation system (BAS) the control signal from the microcontroller or the near field communication device. The building automation system is a system in a building connecting different field devices, servers and/or access devices in the building or in specific areas of the building. The control signal (comprising for example the enablement signal or the disablement signal)

is for example sent from a network infrastructure (intern or extern) to the building automation system, which sends the control signal to the field device, e.g. via its BUS connection, in particular to the microcontroller of the field device, which further sends the control signal to the near field communication system. An operator accesses for example the building automation system on site or remote via the network infrastructure or a mobile device for sending the control signal. In a further embodiment, the control signal is sent from the building automation system to the near field communication device, which transmits the control signal to the field device, in particular to the near field communication system. In this case, the control signal is received by the near field communication system via the building automation system and the near field communication device, sent or triggered for example via a remote server.

In a further aspect of the present disclosure, a heating, ventilation and air conditioning system is specified, which comprises a field device as described above or hereinafter.

In a further aspect of the present disclosure a method for controlling a near field communication via a near field communication system of a field device of a heating, ventilation and air conditioning system is specified, the method comprising:

- receiving, by the near field communication system, a control signal sent from a microcontroller of the field device or sent from a near field communication device which is configured for the near field communication with the near field communication system; and
- controlling, by the near field communication system, the near field communication in response to the received control signal.

In an embodiment, the method further comprises:

- disabling, by the near field communication system, the near field communication in response to discerning in the control signal a disablement signal; or
- enabling, by the near field communication system, the near field communication in response to discerning in the control signal an enablement signal.

In an embodiment, the method further comprises determining, by the microcontroller, a missing electrical energy supply on a power supply terminal of the field device, sending, by the microcontroller the control signal comprising the disablement signal to the near field communication system, upon detection of the missing electrical energy supply.

In an embodiment, the method comprises receiving, by the microcontroller a current power supply information from a power monitoring system, which is configured to monitor the power supply of the field device, wherein the control signal to disable the near field communication is received, by the near field communication system sent from the microcontroller or sent from the near field communication device when the missing electrical energy supply is determined using the current power supply information from the power monitoring system. Current power supply information or present power supply information comprise information or data of the present power supply of the field device. In other words, up-to-date or up-to-the-minute information of the power supply of the field device.

In an embodiment, the method comprises receiving, by the near field communication system, the control signal comprising the disablement signal, which is sent from the microcontroller or from the near field communication device in case a missing bus connection via a bus interface of the field device and/or in case a missing connection via an Ethernet interface of the field device is determined by the microcontroller or the near field communication device.

In an embodiment, the method further comprises sending, by the microcontroller, the control signal to the near field communication system, using energy from an energy buffer in the field device, which is configured to supply electrical energy to the microcontroller.

In an embodiment, the method further comprises transmitting, by the field device, power supply information to the near field communication device and receiving, by the near field communication system the control signal comprising the disablement signal, which is sent from the near field communication device in case the transmitted power supply information indicates the missing electrical energy supply of the field device.

In an embodiment, controlling the near field communication comprises permanently disabling, by the near field communication system, the near field communication in response to discerning in the control signal a permanent disablement signal.

In an embodiment, the method further comprises detecting, by the microcontroller a configuration of the field device via the near field communication system and permanently disabling the near field communication only after detection of the configuration of the field device.

In an embodiment, controlling the near field communication comprises interrupting or closing, by a switching element of the near field communication system an internal connection of a near field communication chip or a connection between the near field communication chip and the microcontroller or an antenna.

In an embodiment, the method further comprises determining, by the microcontroller a current geographical position of the field device, comparing, by the microcontroller the current geographical position with a predefined geographical region; and sending, by the microcontroller, the control signal comprising the disablement signal to the near field communication system, upon detection that the current geographical position of the field device is outside the predefined geographical region; or receiving, by the near field communication system, from the near field communication device the control signal comprising the disablement signal, responsive to a current geographical position of the near field communication device being outside of the predefined geographical region.

The predefined geographical region may be stored in the field device and/or in the near field communication device. The predefined geographical region may also be stored in a remote server and may be retrieved by the near field communication device in dependence of the specific field device. In an embodiment, the predefined geographical region is a predefined usage place of the field device. In other words, the predefined usage place may be the area of the building for which the field device is intended.

In an embodiment, the method further comprises as an initial step, disabling the near field communication as a default setting. In a further embodiment, the method comprises receiving by the near field communication system the control signal comprising the enablement signal from the microcontroller or the near field communication device in dependence of specific properties of the field device, like power supply status, current geographical position, and connection status and/or time specific properties.

In an embodiment, the method comprises receiving, by the near field communication system the control signal comprising the enablement signal, which is sent from the microcontroller or the near field communication device only during one or more predefined timespan(s). According to this embodiment, receiving of the control signal is, for example only possible during the predefined timespans.

In an embodiment, the method for controlling the near field communication via the near field communication system of the field device further comprises to receive by the near field communication system the control signal sent from a building automation system (BAS) via the microcontroller or the near field communication device. The control signal (comprising for example the enablement signal or the disablement signal) is for example sent from a network infrastructure (intern or extern) to the building automation system, which sends the control signal to the field device, e.g. via its BUS connection, in particular to the microcontroller of the field device, which further sends the control signal to the near field communication system. An operator accesses for example the building automation system on site or remote via the network infrastructure or a mobile device for sending the control signal. In a further embodiment, the control signal is sent from the building automation system to the near field communication device, which transmits the control signal to the field device, in particular to the near field communication system. In this case, the control signal is received by the near field communication system via the building automation system and the near field communication device, sent or triggered for example via the remote server.

In a further aspect, a computer program product is specified, which comprises computer program code configured to direct a field device of a heating, ventilation and air conditioning system such that the field device performs the steps as described above and hereinafter.

In jet a further aspect, a computer-readable medium, in particular a non-transitory computer-readable medium, is specified, which has stored therein computer program code configured to direct a field device of a heating, ventilation and air conditioning system such that the field device performs the steps as described above and hereinafter.

BRIEF DESCRIPTION OF THE DRAWINGS

The present disclosure will be explained in more detail, by way of example, with reference to the drawings in which.

DETAILED DESCRIPTION OF THE EMBODIMENTS

Figure 1:
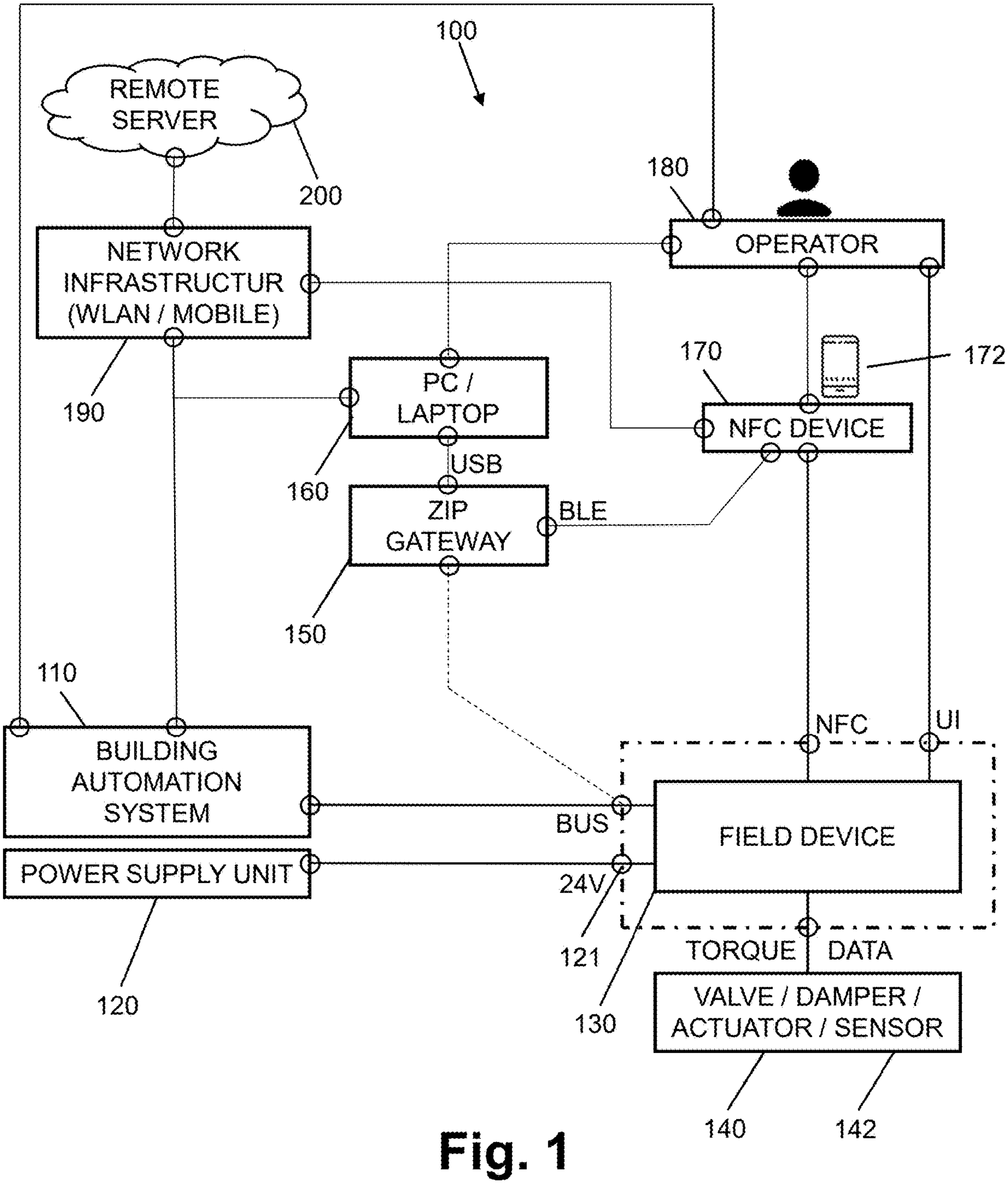
FIG. 1: shows a first block diagram illustrating schematically a HVAC system comprising a field device.

FIG. 1 (abbr.: FIG. 1, as used in the drawings) shows schematically a block diagram illustrating schematically a HVAC system 100. The HVAC system 100 comprises a field device 130 which is configured to control a valve/damper/actuator 140 to control, for example, a flow of fluid of the HVAC system 100. In this embodiment, the field device 130 transmits for example torque via a shaft to the valve/damper, in this embodiment, the field device 130 forms for example an actuator unit. In another embodiment, the field device 130 is connected to a sensor 142 and is configured to receive and process sensor measurement data, in this embodiment the field device 130 forms a sensor unit. In a further embodiment, the field device 130 may transmit control data to an actuator 140, e.g. located outside of the field device 130, which produces the torque accordingly to control an actuated part, e.g. a valve 140 or a damper 140. The field device 130 may also be a combination of the aforementioned embodiments. FIG. 1 further shows schematically that the field device 130 is connected via a BUS interface (ModBus, RS-485) to a building automation system 110. Further, other devices of the HVAC system 100 are, for example, also connected to the building automation system 110. The field device 130 is according to the present disclosure of FIG. 1 supplied with electrical energy via a power supply unit 120. The power supply unit 120 is, for example, an electrical network of a building, a battery system and/or a combination of the aforementioned. The power supply unit 120 provides electrical energy to the field device 130 via a power supply terminal 121 with a voltage, for example, from 12 Volt to 240 Volt, preferably 24 Volt or 230 Volt.

FIG. 1 further shows access possibilities for accessing/contacting the field device 130 by an operator 180. The operator 180 may control a PC/Laptop 160, which is connected via a USB connection to a Gateway 150, which is connected via the BUS system to the field device 130. The field device 130 is according to this embodiment accessible via the PC/Laptop 160 for configuring, commissioning or adapting settings of the field device 130 or to read data from the field device 130. The PC/Laptop 160 is connected via a network infrastructure 190 to a remote server 200. The network infrastructure 190 uses, for example, a mobile data network, such as Global System for mobile Communication (GSM), Code Division Multiple Access (CDMA), or Long Term Evolution (LTE) networks, and/or a close range wireless communication interface using Wi-Fi, Bluetooth®, and/or other wireless area network (WLAN) types and standards. The remote server 200 is, for example, configured to store data, which is used by the PC/Laptop 160 and/or different devices.

FIG. 1 further shows a near field communication device 170 (NFC device) which may be operated by the operator 180. The near field communication device 170 is, for example, a mobile device 172, e.g. a smartphone, tablet or other portable electronic device. The near field communication device 170 is configured to contact or access (read/write) the field device 130 via a near field communication (NFC). Near field communication is a communication protocol, which enables communication between two electronic devices over a distance of, for example, 100 mm or less. The near field communication device 170 is, according to this embodiment, also connected to the remote server 200 via the network infrastructure 190. In addition, the near field communication device 170 is, according to this embodiment, also connected to the gateway 150 via a Bluetooth low energy (BLE) interface. FIG. 1 further shows that the field device 130 comprises a user interface (UI), which may be used by the operator 180 to adjust/configure the field device 130 directly. The configuration possibilities, which are accessible via the user interface of the field device 130 are, for example, limited. In an embodiment, the near field communication device 170 may comprise a dongle/gateway for near field communication, wherein the dongle/gateway is connected via a Bluetooth® connection to the mobile device 172.

Figure 2:
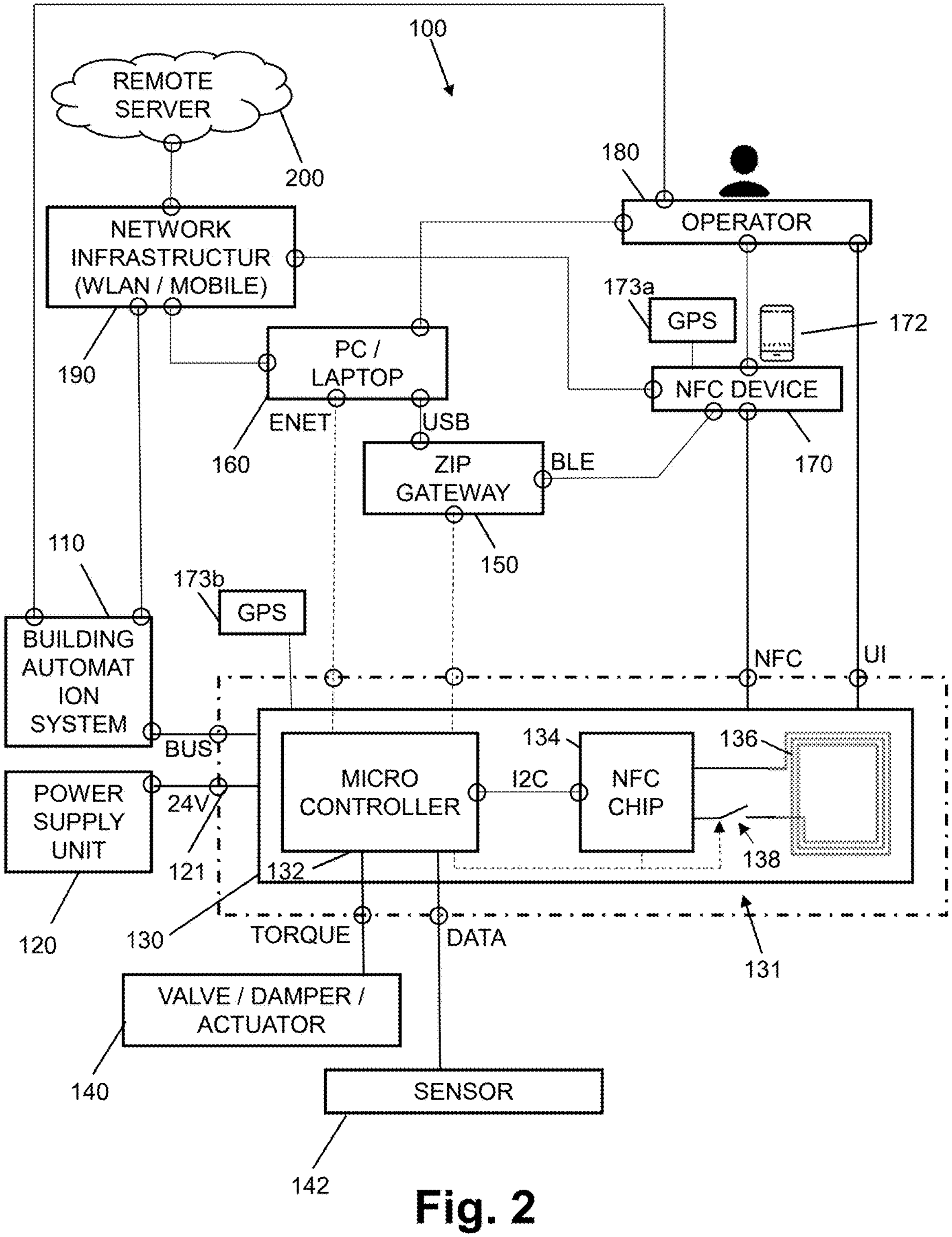
FIG. 2: shows a second block diagram illustrating schematically the HVAC system of FIG. 1, wherein the field device is shown in more detail.

FIG. 2 shows schematically a block diagram illustrating the HVAC system 100 of FIG. 1 in more detail. In particular, the field device 130 and the access possibilities to the field device 130 are illustrated in a more detailed manner. FIG. 2 shows the field device 130 comprising a microcontroller 132 and a near field communication system 131. The microcontroller 132 is configured to control the field device 130. The valve/damper/actuator 140 and the sensor 142 are connected to the microcontroller 132 such that the microcontroller 132 can control these devices. The near field communication system 131 comprises a near field communication chip 134, a near field communication antenna 136 and a switching element 138. The near field communication chip 134 is a silicon component or integrated circuit (IC) which enables, when connected to an appropriate antenna, like the near field communication antenna 136, short range, wireless communication between two devices using near field communication protocols over a distance of for example 100 mm or less, preferably 40 mm or less. The microcontroller 132 is further connected to the near field communication chip 134 of the near field communication system 131 via a serial communication bus, for example, I2C. The switching element 138 is configured to interrupt or close a connection between the near field communication chip 134 and the antenna 136, which enables or disabled the near field communication possibility of the near field communication system 131. The switching element 138 may be arranged at a different position. The switching element 138 is, for example, controlled by the microcontroller 132 or the near field communication chip 134. The switching element 138 provides a particular simple and reliable method to control (e.g. activate or deactivate) the near field communication of the near field communication system 131. The near field communication chip 134 is configured to execute commands from the microcontroller 132 and/or from the near field communication device 170. The near field communication chip 134 is further configured to transmit data from the near field communication device 170 to the microcontroller 132. In an embodiment, the switching element 138 for controlling the near field communication comprises or is a fuse, preferably an electronic fuse. The fuse is in particular configured for permanently disabling the near field communication. The electronic fuse for example controlled by the microcontroller 132 or the near field communication chip 134, e.g. such that a connection is interrupted for disabling the near field communication.

FIG. 2 further shows that the PC/Laptop 160 may be directly connected to the field device 130 via an Ethernet connection ENET. In addition, FIG. 2 further shows a position detecting unit 173*a* arranged in the near field communication device 170. The position detecting unit 173*a* may be a separate device or may be integrated in the near field communication device 170. The position detecting unit 173*a* is configured to determine a current geographical position of the near field communication device 170. It is also conceivable that the field device 130 comprises alternatively or additionally a position detecting unit 173*b* configured to determine the current geographical position of the field device 130. The position detecting unit 173*a*, and/or 173*b* uses, for example, a satellite-based radio navigation system, also known as a global navigation satellite system (GNSS), like the global positioning system GPS, Galileo, GLONASS and/or BeiDou to determine the geographical position. In another embodiment, the position detecting unit 173*a* and/or 173*b* uses a Wi-Fi based positioning system, a cellular positioning system e.g. global system for mobile communication based position system (GSM) or a different kind of positioning system.

FIG. 1 and FIG. 2 further show that the building automation system 110 may also be connected via the network infrastructure 190 to a remote server 200, which enables e.g. remote access to the building automation system 110. Further, the figures show that the operator 180 may access the building automation system 110 directly, for example via an onsite access terminal or indirectly, via the mobile device 172 and the respective network infrastructure 190 or via the PC/Laptop 160 and the respective network infrastructure 190.

Figure 3:
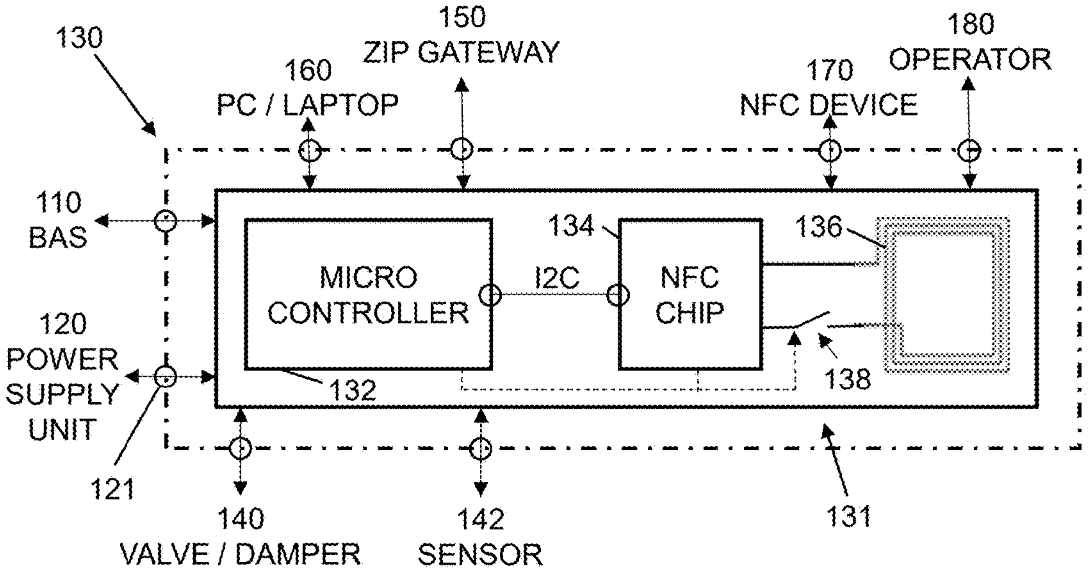
FIG. 3: shows a third block diagram illustrating schematically the field device as shown in the FIG. 2, FIG. 4: shows a first flow diagram illustrating a sequence of steps for controlling a near field communication of a field device.

FIG. 3 shows a third block diagram illustrating schematically the field device 130 as shown in FIG. 2. FIG. 3 shows the field device 130 and the possible connections and interfaces of the field device 130. In particular, the field device 130 shows a connection to the building automation system (BAS) 110, the power supply terminal 121 to the power supply unit 120, a connection to the valve/damper/actuator 140, for example via a shaft, a connection to the sensor 142, a direct access possibility for the operator 180 via the user interface, the NFC access possibility for the near field communication device 170, the access possibility via the gateway 150 and the access possibility for the PC/Laptop 160 via Ethernet.

In an embodiment, the field device 130 comprises a power monitoring system (not shown in the Figures), which is configured to monitor the power supply terminal 121, and wherein the power monitoring system is configured to transmit current power supply information to the microcontroller 132 and/or to the near field communication device 170. The power monitoring system may monitor a current or a different electrical parameter for determining the current power supply information. In a further embodiment, the field device 130 comprises an energy buffer (not shown), which is configured supply electrical energy to the microcontroller 132 in case the power supply unit 120 does not. The energy buffer is for example a battery. The energy buffer is, in another embodiment, a parasitic capacitance within the field device 130.

Figure 4:
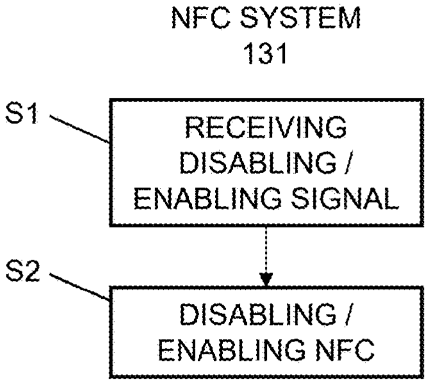

FIG. 4 shows a first flow diagram illustrating a sequence of steps for controlling a near field communication of the field device 130. In the following paragraphs, described with reference to FIG. 4 is a possible sequence of steps, performed by the near field communication system 131 for controlling the near field communication of the field device 130.

In step S1, the near field communication system 131 receives a control signal, which is sent from the microcontroller 132 of the field device 130, or which is sent from the near field communication device 170. For example, the microcontroller 132 sends the control signal to the near field communication system 131 via the 12C connection, or the near field communication device 170 sends the control signal to the near field communication system 131 using a near field connection established between the near field communication device 170 and the field device 130. The control signal is a signal sent from the microcontroller 132 or the near field communication device 170 to control the near field communication system 131. In an embodiment, the control signal is received by the microcontroller 132 from the building automation system 110, or the control signal is received by the near field communication system 131 from the near field communication device 170, which received the control signal from the building automation system 110, for example using the network infrastructure 190.

In step S2, the near field communication system 131 controls the near field communication in response to the received control signal. In other words, the received control signal is used by the near field communication system 131 to control the near field communication of the field device 130. According to the present disclosure it is possible to control the NFC functionality of the field device 130 by the field device 130 itself in dependence on the received control signal. This enables that third party access is restricted, for example, after the field device 130 is commissioned.

The control signal comprising a disablement signal triggers/causes disabling of the near field communication by the near field communication system 131 or the control signal comprising an enablement signal triggers/causes enabling/activating of the near field communication by the near field communication system 131. The control signal comprising the disablement signal is sent to interrupt the near field communication in case an interruption/deactivation is requested/required. The control signal comprising the enablement signal is sent to activate the near field communication in case the activation is requested/required.

The near field communication is disabled (S2), by the near field communication system 131, in response to discerning in the control signal the disablement signal. The near field communication is enabled (S2), by the near field communication system 131, in response to discerning in the control signal the enablement signal.

With respect to the FIGS. 4 to 12, the control signal may comprise a disablement signal to disable the near field communication or may comprise an enablement signal to enable the near field communication.

In an embodiment, the control signal comprising the disablement signal may trigger a partial disabling of the near field communication. In other words, the near field communication is at least partially disabled but not entirely. In an embodiment, the control signal comprising the enablement signal may trigger a partial enabling of the near field communication. In other words, the near field communication is at least partially enabled but not entirely. Partially enabling of the near field communication is for example, to enable reading or writing of specific configuration data, settings and/or operational/diagnostic data. Partially disabling of the near field communication is, for example, to disable reading or writing of specific configuration data, settings and/or operational/diagnostic data.

Figure 5:
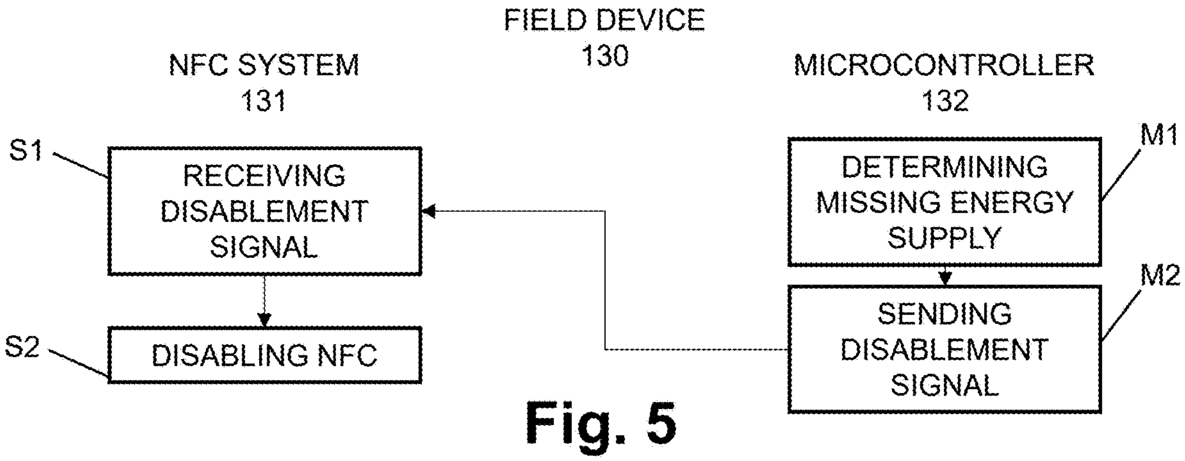
FIG. 5: shows a second flow diagram illustrating a first sequence of steps for disabling a near field communication of a field device.

FIG. 5 shows a second flow diagram illustrating a first sequence of steps for disabling the near field communication of the field device 130. In the following paragraphs, described with reference to FIG. 5 is a possible sequence of steps, performed by the near field communication system 131 for disabling the near field communication of the field device 130.

As it can be seen in FIG. 5, the sequence of steps is performed within the field device 130 between the microcontroller 132 and the near field communication system 131 of the field device 130.

In step M1, the microcontroller 130 of the field device 130 determines a missing electrical energy supply via the power supply terminal 121 from the power supply unit 120. For example, during operation, the field device 130 is supplied with electrical energy by the power supply unit 120. The power monitoring system may be used to determine and monitor the current electrical energy supply of the field device 130. In case the power monitoring system determines, for example a drop in voltage, a corresponding signal is sent to the microcontroller 132, which is used by the microcontroller 132 to determine the missing electrical energy supply.

In step M2, the microcontroller 132 of the field device 130 sends the control signal comprising the disablement signal to the near field communication system 131 in response to the determined missing electrical energy supply of the field device 130. The energy buffer in the field device 130 is used to send the control signal.

In step S1 of FIG. 5, the near field communication system 131 receives the control signal comprising the disablement signal transmitted from the microcontroller 132.

In step S2 of FIG. 5, the near field communication system 131 disables the near field communication in response to the discerning in the control signal the disablement signal.

In dependence of the supply of electrical energy to the field device 130 it is possible to control the near field communication via the near field communication system 131. The power supply status is according to this embodiment determined by the microcontroller 132 and in dependency of the outcome of the determination is the near field communication disabled or not. When the field device 130 is supplied with electrical energy, then the near field communication is, for example, enabled. When the field device 130 is not supplied with electrical energy, the near field communication is disabled.

Figure 6:
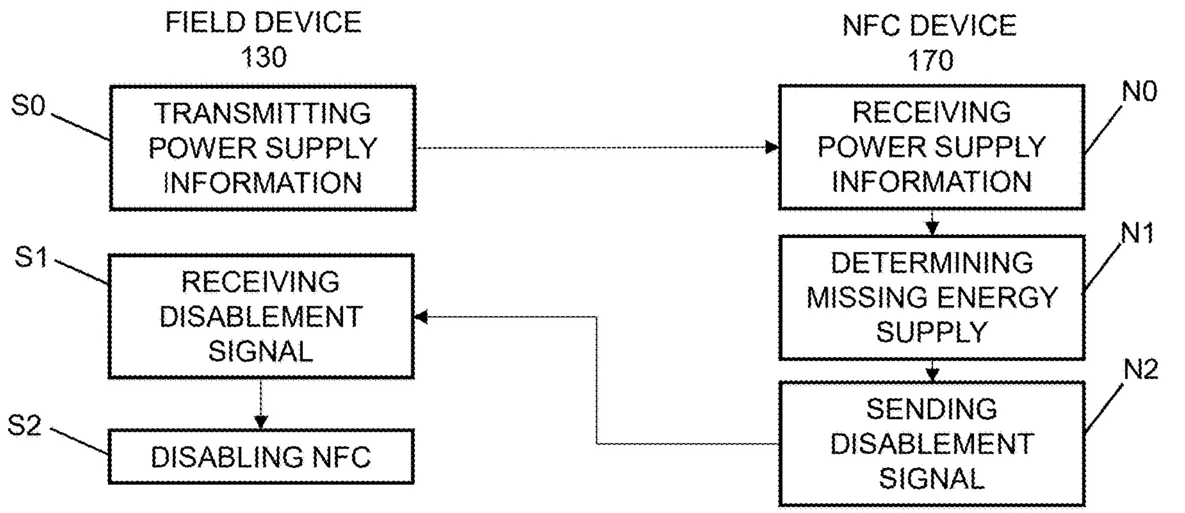
FIG. 6: shows a third flow diagram illustrating a second sequence of steps for disabling a near field communication of a field device.

FIG. 6 shows a third flow diagram illustrating a second sequence of steps for disabling a near field communication of a field device 130. In the following paragraphs, described with reference to FIG. 6 is a possible sequence of steps, performed by the field device 130 and the near field communication device 170 for disabling the near field communication of the field device 130.

In step S0, the field device 130, transmits power supply information to the near field communication device 170. The power supply information determined by the microcontroller 132 may be transmitted by the near field communication system 131 to the near field communication device 170. Energy from the energy buffer may be used for transmitting the power supply information to the near field communication device 170. In another embodiment, energy received by the near field communication device 170 is used to transmit the power supply information to the near field communication device 170. In another embodiment, the power supply information may be stored in and transmitted from the near field communication chip 134.

In step N0, the near field communication device 170 receives the transmitted power supply information. Power supply information includes, in an embodiment, a missing response to a power supply request of the field device 130. In other words, not receiving a response to the power supply request is also considered as power supply information.

In step N1, the near field communication device 170 determines if an electrical energy supply of the field device 130 is missing or is present using the received power supply information.

In step N2, the near field communication device 170 sends the control signal comprising the disablement signal in case the near field communication device 170 determines (step N1) that the field device 130 is not supplied with electrical energy.

In the step S1, the field device 130 receives the control signal comprising the disablement signal from the near field communication device 170. In particular, the near field communication system 131 receives the disablement signal and disables in step S2 the near field communication in response to discerning in the control signal the disablement signal. Required energy may be used for example from the energy buffer or energy transferred from the near field communication device 170 via the NFC connection.

These steps may be performed by the field device 130 and the near field communication device 170 as an initial sequence which is required to allow access to the microcontroller 132 of the field device 130. For example, the near field communication device 170 is placed near the field device 130. The near field communication device 170 establishes a NFC connection with the field device 130. The field device 130 transmits power supply information indicating that the field device 130 is supplied with electrical energy. In this case the near field communication device 170 is allowed to access the microcontroller 132. In case the field device 130 transmits power supply information indicating that the field device 130 is not supplied with electrical energy, for example during shipment of the field device 130 or before installation of the field device 130, the near field communication device 170, in particular an application running on the near field communication device 170 sends automatically the control signal comprising the disablement signal to the field device 130, which disables the near field communication functionality of the field device 130. This may terminate the NFC connection with the near field communication device 170 and prevents unintended access to the field device 130.

Figure 7:
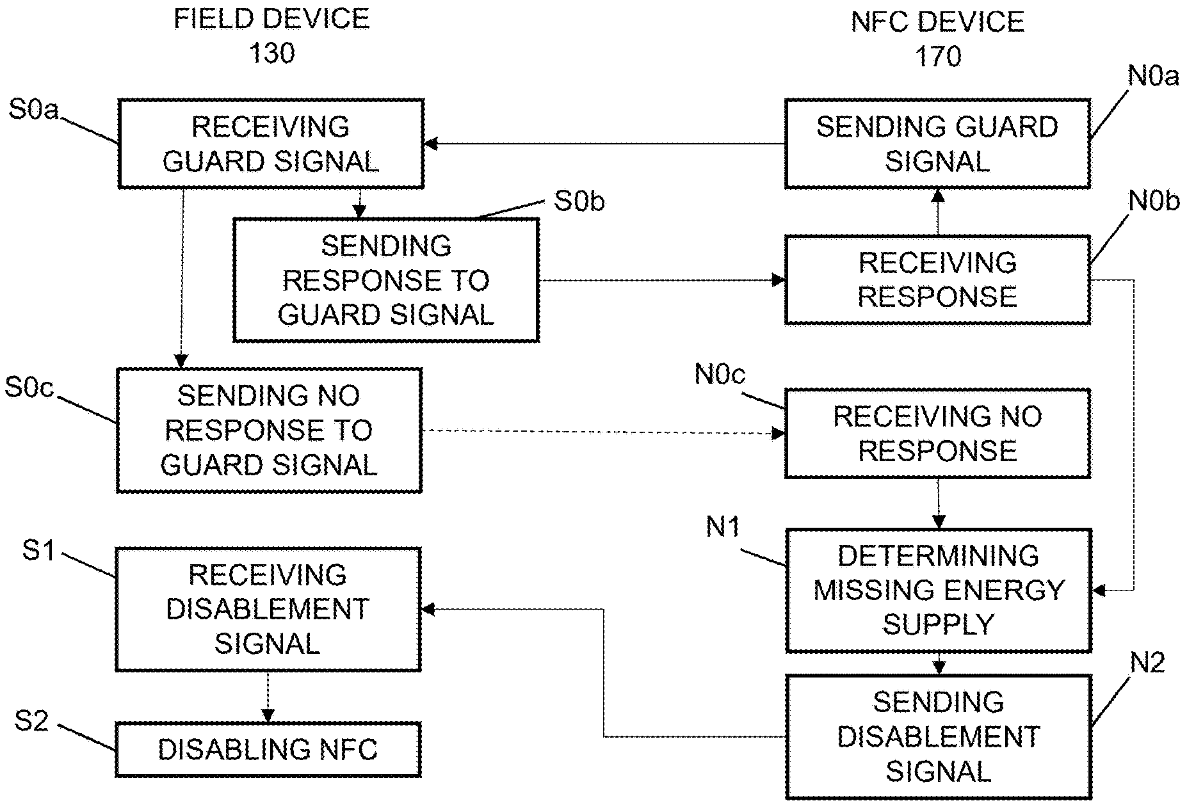
FIG. 7: shows a fourth flow diagram illustrating a third sequence of steps for disabling a near field communication of a field device.

FIG. 7 shows a fourth flow diagram illustrating a third sequence of steps for disabling a near field communication of the field device 130. In the following paragraphs, described with reference to FIG. 7 is a possible sequence of steps, performed by the field device 130 and the near field communication device 170 for disabling the near field communication of the field device 130.

In step N0*a*, the near field communication device 170 sends a guard signal to the field device 130. The guard signal is a signal which is configured to be used to determine a status of the field device, like the power supply status or a connection status.

In step S0*a*, the field device 130, in particular the microcontroller 132 of the field device 130, receives the guard signal, for example, via the established NFC connection.

In step S0*b*, the field device 130, in particular, the microcontroller 132 of the field device 130, sends a response to the near field communication device 170, via the established NFC connection. The response may comprise information on the status of the power supply of the field device 130 or the status of connections of the field device 130, like an Ethernet connection ENET, or a connection to the building automation system 110.

In step N0*b*, the near field communication device 170 receives the response from the field device 130. The response itself, or the content of the response may be used by the near field communication device 170 to determine, for example the missing energy supply of the field device 130. In case the response indicates that the field device 130 is supplied with electrical energy the sequence returns to step N0*a*, and initiates another loop of sending/receiving the guard signal, for example, after a predefined timespan.

In step S0*c*, the field device 130 does not send a respond to the near field communication device 170 after receiving the guard signal.

In step N0*c*, the near field communication device 170 does not receive a response from the field device 130. In other words, the near field communication device 170 determines that no response is received from the field device 130.

In step N1, the near field communication device 170 determines the missing energy supply or a missing connection based on the missing response of step N0*c* or on the received response of step N0*b*.

In step N2, the near field communication device 170 sends the control signal comprising the disablement signal to the field device 130 due to the determined missing energy supply.

In step S1, the field device 130 receives the disablement signal and in steps S2, the field device 130, in particular, the near field communication system 131 of the field device 130 disables the near field communication of the field device 130.

In this embodiment, not receiving a response to the guard signal is interpreted by the near field communication device 170 such that the control signal comprising the disablement signal is sent. The missing response is interpreted by the near field communication device 170 such that the field device 130 is not supplied with electrical energy.

Figure 8:
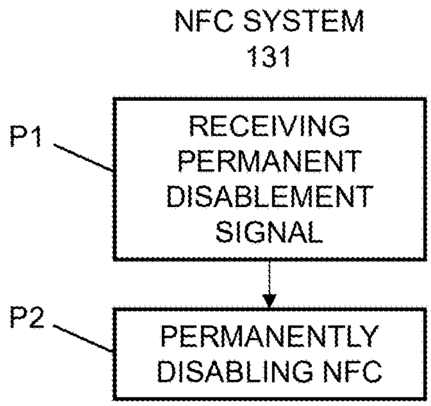
FIG. 8: shows a fifth flow diagram illustrating a first sequence of steps for permanently disabling a near field communication of a field device.

FIG. 8 shows a fifth flow diagram illustrating a first sequence of steps for permanently disabling a near field communication of the field device 130. In the following paragraphs, described with reference to FIG. 8 is a possible sequence of steps, performed by the near field communication system 131 for permanently disabling the near field communication of the field device 130.

In step P1, the near field communication system 131 receives the control signal comprising a permanent disablement signal, which is sent from the microcontroller 132 of the field device 130, or which is sent from the near field communication device 170.

In step P2, the near field communication system 131 permanently disables the near field communication in response to discerning in the control signal the permanent disablement signal. Permanent disablement means that an activation or reactivation of the near field communication is not possible. In other words, the disablement of the near field communication is irreversible. This is for example useful in highly sensitive areas, in which an NFC access to the field device 130 is enabled only once, for example during commissioning. In an embodiment, the reactivation of the near field communication via the near field communication system 131 is possible, for example via the Ethernet access.

Figure 9:
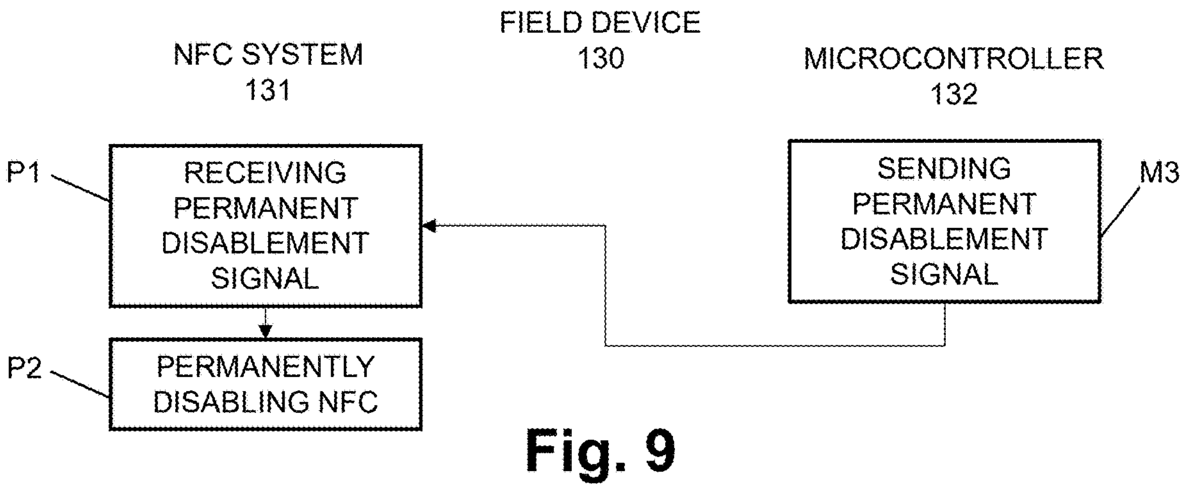
FIG. 9: shows a sixth flow diagram illustrating a second sequence of steps for permanently disabling a near field communication of a field device.

FIG. 9 shows a sixth flow diagram illustrating a second sequence of steps for permanently disabling a near field communication of a field device 130. In the following paragraphs, described with reference to FIG. 9 is a possible sequence of steps, performed by the field device 130 for permanently disabling the near field communication of the field device 130.

In step M3, the microcontroller 132 of the field device 130 sends the control signal comprising the permanent disablement signal to the near field communication system 131.

In step P1, the near field communication system 131 receives the permanent disablement signal and in step P2, the near field communication system 131 permanently disables the near field communication in response to discerning in the control signal the permanent disablement signal.

According to this embodiment, the permanent disabling of the near field communication is performed only within the field device 130, which is in particular simple, reliable and safe.

Figure 10:
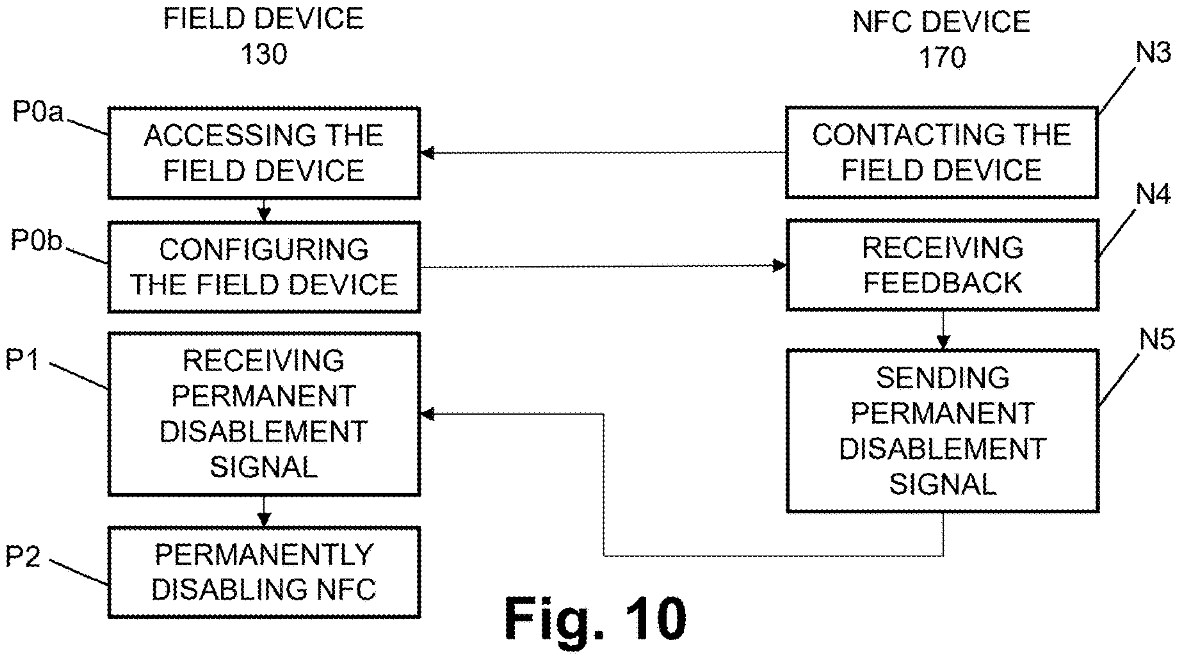
FIG. 10: shows a seventh flow diagram illustrating a third sequence of steps for permanently disabling a near field communication of a field device.

FIG. 10 shows a seventh flow diagram illustrating a third sequence of steps for permanently disabling a near field communication of a field device 130. In the following paragraphs, described with reference to FIG. 10 is a possible sequence of steps, performed by the field device 130 and the near field communication device 170 for permanently disabling the near field communication of the field device 130.

In step N3, the near field communication device 170 contacts the field device 130. The near field communication device 170 is, for example, placed in the vicinity of the field device 130, e.g. equal or less than 100 mm, more preferably equal or less than 40 mm, which may trigger automatically contacting of the field device 130. In another embodiment, contacting may be triggered by the operator 180 of the near field communication device 170.

In step P0*a*, the field device 130 is accessed by the near field communication device 170 via the near field communication system 131 of the field device 130. In other words, the field device 130 is contacted by the near field communication device 170 such that reading and/or writing of the field device 130 is enabled via the near field communication system 131 of the field device 130.

In step P0*b*, the field device 130 is configured by the near field communication device 170. Configuring may comprise commissioning of the field device 130, amending settings of the field device 130, in particular of the microcontroller 132 of the field device 130.

In step N4, the near field communication device 170 receives feedback of the step P0*b*. In other words, the near field communication device 170 receives information on the accessing and/or configuration of the field device 130. In dependence on the received information the near field communication device 170 initiates sending of the control signal comprising the permanent disablement signal. In case the accessing and configuring of the field device 130 was successful, a respective information is received by the near field communication device 170, sent by the field device 130. This initiates sending of the control signal comprising the permanent disablement signal.

In step N5, the near field communication device 170 sends the permanent disablement signal to the field device 130, in particular to the near field communication system 131 of the field device 130, based on the received feedback of step N4.

In step P1, the field device 130 receives the control signal comprising the permanent disablement signal and in step P2, the field device 130 permanently disables the near field communication of the field device 130.

According to this embodiment, the near field communication of the field device 130 is permanently disabled after the field device 130 has been, for example, commissioned. This creates the advantage that no third party can access the field device 130 after commissioning of the field device 130 by the near field communication device 170 has been completed.

Figure 11:
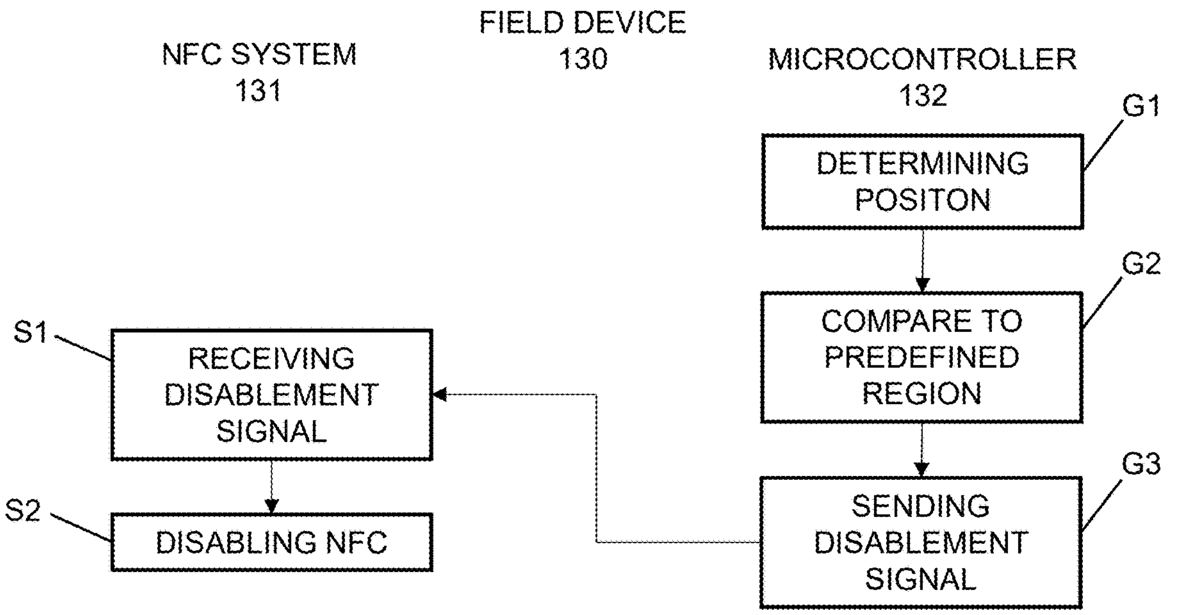
FIG. 11: shows an eighth flow diagram illustrating a first sequence of steps for disabling a near field communication of a field device using a current geographical position.

FIG. 11 shows an eighth flow diagram illustrating a first sequence of steps for disabling a near field communication of the field device 130 using a current or present geographical position. In the following paragraphs, described with reference to FIG. 11 is a possible sequence of steps, performed by the field device 130 for disabling the near field communication of the field device 130.

In step G1, the microcontroller 132 of the field device 130 determines a current geographical position of the field device 130. The microcontroller 132, may use the position detecting unit 173*b* integrated within the field device 130.

In step G2, the microcontroller 132 compares the determined current geographical position with a predefined geographical region and determines if the current geographical position is located within or outside the predefined geographical region. The predefined geographical region may be stored in the microcontroller 132. In another embodiment, the predefined geographical region may be retrieved by the microcontroller 132 from the remote server 200.

In step G3, the microcontroller 132 sends the control signal comprising the disablement signal to the near field communication system 131 in case the determined current geographical position is located outside the predefined geographical region. It is also conceivable that the microcontroller 132 sends the control signal comprising the enablement signal to the near field communication system 131 in case the determined current geographical position is inside the predefined geographical region.

In step S1, the control signal comprising the disablement signal is received by the near field communication system 131 and in step S2, the near field communication is disabled by the near field communication system 131 in response to discerning in the control signal the disablement signal. Alternatively, in step S1 and step S2, the near field communication may be enabled respectively in case the received control signal comprises the enablement signal.

Based on the current geographical position of the field device 130 it is possible to control the NFC, which is in particular advantageous to avoid unintended third-party access, in particular during shipment of the field device 130.

Figure 12:
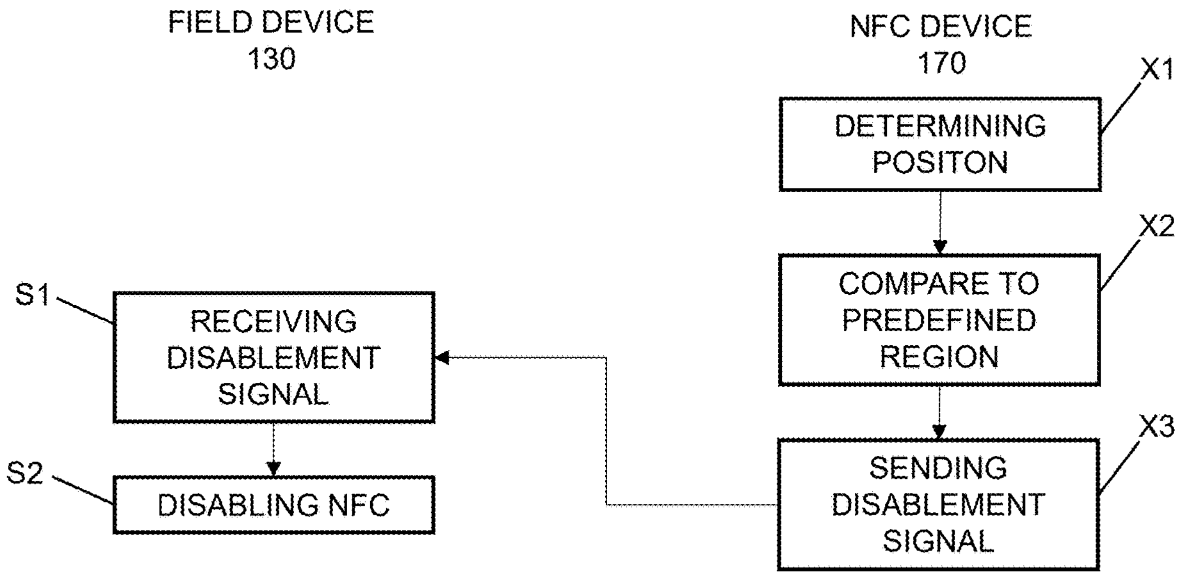
FIG. 12: shows a ninth flow diagram illustrating a second sequence of steps for disabling a near field communication of a field device using a current geographical position.

FIG. 12 shows a ninth flow diagram illustrating a second sequence of steps for disabling a near field communication of a field device 130 using a current geographical position. In the following paragraphs, described with reference to FIG. 12 is a possible sequence of steps, performed by the field device 130 and the near field communication device 170 for disabling the near field communication of the field device 130.

In step X1, the near field communication device 170 determines a current geographical position of the near field communication device 170. The near field communication device 170, may use the position detecting unit 173*a* integrated within the near field communication device 170.

In step X2, the near field communication device 170 compares the determined current geographical position with a predefined geographical region and determines if the current geographical position is located within or outside the predefined geographical region. The predefined geographical region may be stored in the near field communication device 170. In another embodiment, the predefined geographical region may be retrieved by the near field communication device 170 from the remote server 200. The predefined geographical region is for example, retrieved in dependence of the specific field device 130.

In step X3, the near field communication device 170 sends the control signal comprising the disablement signal to the field device 130, in particular to the near field communication system 131, in case the determined current geographical position is located outside the predefined geographical region. It is also conceivable that the near field communication device 170 sends the enablement signal to the field device 130 in case the determined current geographical position is inside the predefined geographical region.

In step S1, the control signal comprising the disablement signal is received by the field device 130, in particular the near field communication system 131, and in step S2, the near field communication is disabled by the near field communication system 131. Alternatively, in step S1 and step S2, the near field communication may be enabled respectively in case the received control signal comprises the enablement signal.

Based on the current geographical position of the near field communication device 170, which is for the NFC connection located next to the field device 130, it is possible to control the near field communication, which is, in particular, advantageous to avoid unintended third-party access, in particular during shipment of the field device 130. In this embodiment, the position detecting unit 173*a* of the near field communication device 170 is used. A separate position detecting unit 173*b* within the field device 130 is not required which advantageously reduces the number of parts.

These steps as presented with reference to FIGS. 11 and 12 may be performed by the field device 130 and the near field communication device 170 as an initial sequence which is required to allow access to the microcontroller 132 of the field device 130.

It should be noted that, in the description, the sequence of the steps has been presented in a specific order, one skilled in the art will understand, however, that the order of at least some of the steps could be altered, without deviating from the scope of the present disclosure.

LIST OF REFERENCE SIGNS

100 HVAC System
110 Building Automation System
120 Power supply unit
121 Power supply terminal
130 Field Device
132 Microcontroller
131 Near field communication system
134 NFC Chip
136 Antenna
138 Switching element
140 Valve/Damper/Actuator
142 Sensor
150 ZIP Gateway
160 PC/Laptop
170 NFC Device
172 Mobile device
173*a* Position detecting unit of NFC Device
173*b* Position detecting unit of Field Device
180 Operator
190 Network Infrastructure
200 Remote Server
210 Processing system
S0 transmitting power supply information
S0*a* receiving guard signal
S0*b* sending response to guard signal
S0*c* sending no response to guard signal
S1 receiving enabling/disabling signal
S2 enabling/disabling NFC
P1 receiving permanent disablement signal
P2 permanently disabling NFC
M1 determining missing energy supply
M2 sending disablement signal
M3 sending permanent disablement signal
N0 receiving power supply information
N0*a* sending guard signal
N0*b* receiving response to guard signal
N0*c* receiving no response to guard signal
N1 determining missing energy supply
N2 sending disablement signal
N3 contacting the field device
N4 receiving feedback
N5 sending permanent disablement signal

The invention claimed is:

1. A field device of a heating, ventilation and air conditioning system, the field device comprising:

a microcontroller configured to control the field device; and a near field communication system which is connected to the microcontroller and which comprises a near field communication chip and an antenna, the near field communication system being configured for a near field communication with a near field communication device;

wherein the near field communication system is configured to control the near field communication in response to receiving a control signal from the microcontroller or the near field communication device, and wherein the near field communication system is configured to disable the near field communication in response to discerning in the control signal a disablement signal, or wherein the near field communication system is configured to enable the near field communication in response to discerning in the control signal an enablement signal, and wherein the near field communication system is configured to permanently disable the near field communication in response to discerning in the control signal a permanent disablement signal.

2. The field device according to claim 1, wherein the field device further comprises:

a power supply terminal configured to supply electrical energy to the field device; and the microcontroller is configured to determine a missing electrical energy supply on the power supply terminal, and to send the control signal comprising the disablement signal to the near field communication system, upon detection of missing electrical energy supply.

3. The field device according to claim 2, wherein the microcontroller comprises:

an energy buffer configured to supply electrical energy to the microcontroller; and wherein the microcontroller is configured to send the control signal to the near field communication system using energy from the energy buffer.

4. The field device according to claim 1, wherein the field device is configured to transmit power supply information to the near field communication device, and the near field communication system is configured to receive from the near field communication device the control signal comprising the disablement signal, responsive to the power supply information indicating missing electrical energy supply.

5. The field device according to claim 1, wherein the microcontroller is configured to detect a configuration of the field device by the near field communication device via the near field communication system; and the near field communication system is configured to permanently disable the near field communication only after detection of the configuration of the field device.

6. The field device according to claim 1, wherein the near field communication system further comprises:

a switching element configured to control the near field communication of the field device using the control signal, wherein controlling by the switching element comprises interrupting or closing an internal connection of the near field communication chip or a connection between the near field communication chip and the microcontroller or the antenna.

7. The field device according to claim 1, wherein the microcontroller is configured to determine a current geographical position of the field device, to compare the current geographical position of the field device with a predefined geographical region, and to send the control signal comprising the disablement signal to the near field communication system, upon detection that the current geographical position of the field device is outside the predefined geographical region.

8. A heating, ventilation and air conditioning system comprising the field device according to claim 1.

9. A method for controlling a near field communication via a near field communication system of a field device of a heating, ventilation and air conditioning system, the method comprising:

receiving, by the near field communication system, a control signal sent from a microcontroller of the field device or sent from a near field communication device;

controlling, by the near field communication system, the near field communication in response to the received control signal, wherein controlling comprises:

disabling, by the near field communication system, the near field communication in response to discerning in the control signal a disablement signal, and/or enabling, by the near field communication system, the near field communication in response to discerning in the control signal an enablement signal, and permanently disabling, by the near field communication system, the near field communication in response to discerning in the control signal a permanent disablement signal.

10. The method according to claim 9, further comprising:

determining, by the microcontroller, a missing electrical energy supply on a power supply terminal of the field device, and sending, by the microcontroller the control signal comprising the disablement signal to the near field communication system, upon detection of missing electrical energy supply.

11. The method according to claim 10, further comprising:

sending, by the microcontroller, the control signal to the near field communication system, using energy from an energy buffer in the field device.

12. A non-transitory computer-readable medium having stored therein computer program code which, when executed by a field device of a heating, ventilation and air conditioning system, causes the field device to perform the method of claim 9.

13. A computer program product comprising the non-transitory computer-readable medium according to claim 12.

14. The method according to claim 9, further comprising:

transmitting, by the field device, power supply information to the near field communication device; and receiving, by the near field communication system the control signal comprising the disablement signal, which is sent from the near field communication device in case the transmitted power supply information indicates missing electrical energy supply of the field device.

15. The method according to claim 9, further comprising:

detecting, by the microcontroller, a configuration of the field device via the near field communication system; and permanently disabling the near field communication only after detection of the configuration of the field device.

16. The method according to claim 9, wherein the controlling comprises:

interrupting or closing, by a switching element of the near field communication system an internal connection of a near field communication chip or a connection between the near field communication chip and the microcontroller or an antenna.

17. The method according to claim 9, further comprising:

determining, by the microcontroller a current geographical position of the field device, comparing, by the microcontroller the current geographical position with a predefined geographical region; and sending, by the microcontroller the control signal comprising the disablement signal to the near field communication system, upon detection that the current geographical position of the field device is outside the predefined geographical region; or receiving, by the near field communication system, from the near field communication device the control signal comprising the disablement signal, responsive to a current geographical position of the near field communication device being outside of the predefined geographical region.

* * * * *